United States Patent [19]

Lemke et al.

[11] 4,237,462
[45] Dec. 2, 1980

[54] RADAR SYNCHRONIZING APPARATUS AND METHOD

[76] Inventors: James U. Lemke, 1728 Ocean Front, Del Mar, Calif. 92014; James A. Bixby, 5640 Sandburg Ave., San Diego, Calif. 92122

[21] Appl. No.: 16,103

[22] Filed: Feb. 28, 1979

[51] Int. Cl.³ .............................................. G01S 7/28
[52] U.S. Cl. ..................................... 343/5 R; 89/133
[58] Field of Search ........................ 343/5 R; 89/133

[56] References Cited
U.S. PATENT DOCUMENTS

2,225,599 12/1940 Gaty et al. .............................. 89/133

*Primary Examiner*—T. H. Tubbesing
*Attorney, Agent, or Firm*—Brown & Martin

[57] ABSTRACT

Disclosed is an apparatus and method for synchronizing the firing of radar pulses from behind the propeller of an airplane. The apparatus simultaneously senses the instantaneous azimuth angle at which the radar is to be fired, and the instantaneous rotational speed of the propeller. Based on these variables, the apparatus determines a dead zone within which the radar cannot be fired without either the pulse or its return hitting the propeller. The apparatus also receives an externally generated timing signal that defines a plurality of consecutive fixed length time frames. During each of these time frames, and while the propeller is not in the dead zone, the synchronizer generates a predetermined number of commands to fire the radar.

12 Claims, 11 Drawing Figures

Fig. 11 ns. Finally, the prop reflected energy would be interpreted by the receiver as a ground or storm return and would create "holes" in the display detracting from its accuracy and interpretability.

RADAR SYNCHRONIZING APPARATUS AND METHOD

BACKGROUND OF THE INVENTION

Single engine aircraft are a substantial majority of the total national fleet. It has been determined that these aircraft can achieve performance and load carrying capabilities comparable with small twin engine aircraft. Many of the features normally associated with high performance aircraft are being provided in single engine airframes. Such features include pressurization, six place seating, high altitude capability (e.g., turbo charging), and prop and wing deicing systems. The single feature, common in twin engine aircraft, and unavailable in single engine aircraft, is weather radar. Weather radar is considered a safety essential by many pilots for transit through areas experiencing convective activity (thunder storms). Without the capabilities of radar, the capabilities of a single engine aircraft as an all-weather transportation machine are seriously compromised.

The normal position for mounting the radome and radar antenna is in the otherwise unoccupied nose section of twin engine aircraft. In single engine aircraft, this same general area is occupied by the engine, propeller, and accessories. Accordingly, in attempting to provide satisfactory radar capabilities for single engine aircraft, various manufacturers have proposed radome and radar antenna locations other than the nose section. For example, in one such prior art radar system, the aircraft wing is structurally modified to accommodate a radar antenna and radome in the leading edge of the wing. In such installation, space constraints dictate the use of a generally elipsoidal cross-section. The reflector is pivoted with respect to the wave guide to scan the radar. Thus, other than at the straight-ahead orientation, the reflector is at a less than optimum relationship with the wave guide. The disadvantages of such a system include long required cable lengths between the antenna and electronics, structural modification of the wing, relatively low range, and poor definition, due to the antenna configuration.

Another prior art single engine radar system incorporates a wing mounted pod in which the radome and radar antenna are mounted. Such a wing mounted radome alters the flight characteristics of the aircraft and is a source of substantial drag. To minimize the drag increase, the antenna size must also be minimized, resulting in poorer than normal radar performance. The highly curved radome necessitated by the aerodynamic characteristics of the enclosure has relatively poor radar transmitting efficiency. Particularly on high wing aircraft, the wing pod mount also subjects the crew and passengers to a higher than normal microwave radiation exposure. The radiation is produced by the side lobe or secondary lobes, prominent in compromise antenna designs.

Some of the deficiencies of the prior art systems could be overcome if the radome and antenna could be located on a portion of the aircraft providing space for a radome of conventional size and configuration and forward of the crew and passengers. The engine cowl of the aircraft has never been utilized for this purpose, presumably because of the interference with the propeller arc and other requirements, such as the engine air induction system in the space available. In such a location, radar energy hitting the propeller would include the components of the primary lobe and high energy level would be reflected directly back into the cockpit. The reflected energy would also produce an extremely high signal level which could damage receiver components. Finally, the prop reflected energy would be interpreted by the receiver as a ground or storm return and would create "holes" in the display detracting from its accuracy and interpretability.

SUMMARY OF THE INVENTION

In an exemplary embodiment of the invention, the disadvantages of prior art single engine radar systems are overcome by a system which locates the radome and antenna in the engine compartment, mounted on the engine cowl and synchronizes the radar pulse to the propeller blades. The advantages of this location include the reduction in spurious microwave energy reaching the cockpit, the availability of sufficient cross-sectional area to make use of the highly efficient phased array antenna, and the capability of utilizing a highly efficient radome, because the curvature of the radome may be minimized without compromising the aerodynamic characteristics of the aircraft. The location also eliminates the necessity for drag producing separate appendages from the aircraft structure and minimizes the cable lengths to even less than those frequently associated with twin engine installations.

These and other objects are accomplished in accordance with the invention by a synchronizer which includes a phase locked loop that generates a signal PROPSPEED having a magnitude representative of the speed of the propeller, and aother signal PROPPHASE which is saw toothed shaped and has a magnitude indicating the phase of the propeller. A second circuit utilizes the PROPSPEED signal to generate another signal $\phi$ enter which indicates the angle of the propeller at which the dead zone starts. Signal $\phi$ enter is of the form $K_1$ times the azimuth angle at which the radar is to be fired plus $K_2$ times the prop speed signals plus $K_3$, where $K_1$, $K_2$, and $K_3$ are constants.

A third circuit compares the signals PROPPHASE AND $\phi$ enter, and generates a DEADZONE signal which starts at the time instant when signal PROPPHASE exceeds the magnitude of signal $\phi$ enter. The DEADZONE signal has a pulsewidth of the form $K_4$ divided by the magnitude of the prop speed signal plus $K_5$, where $K_4$ and $K_5$ are constants. This pulse width is representative of the time duration of the dead zone.

A fourth circuit uses the DEAD ZONE signal to actually generate FIRE commands to the radar. This circuit also has another input for receiving signals which indicate the beginning of each frame. The circuit generates a predetermined number of fire commands between these frames such that none of FIRE commands occur during the dead zone.

BRIEF DESCRIPTION OF THE DRAWINGS

The preferred embodiments of the invention will best be understood by reference to the following detailed description when read in conjunction with the accompanying drawings wherein.

DETAILED DESCRIPTION

Figure 1:
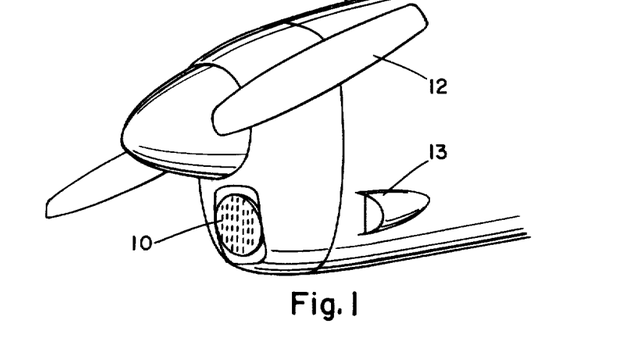
FIG. 1 is a pictorial view illustrating how the disclosed invention is mounted in an airplane.

Referring now to FIG. 1, there is illustrated a pictorial view of an airplane which contains a synchronized radar system that is constructed according to the invention. This system includes a ten inch flat plate phased array antenna 10, which is mounted in the nose of an airplane 11 behind its propeller 12. In order to provide room for antenna 10, the engine air induction system that normally occupies that space is removed and replaced by air intake scoops 13 on the side of the cowl.

A receiver/transmitter unit 14 connects to antenna 10 and is also mounted within the airplane's cowl. Suitably, unit 14 is rigidly attached to the firewall. After installation, antenna 10 is covered with a honeycomb reinforced radome (not shown). Such radomes are readily available, and they transmit over ninety-eight percent (98%) of the radar signal.

Figure 2:
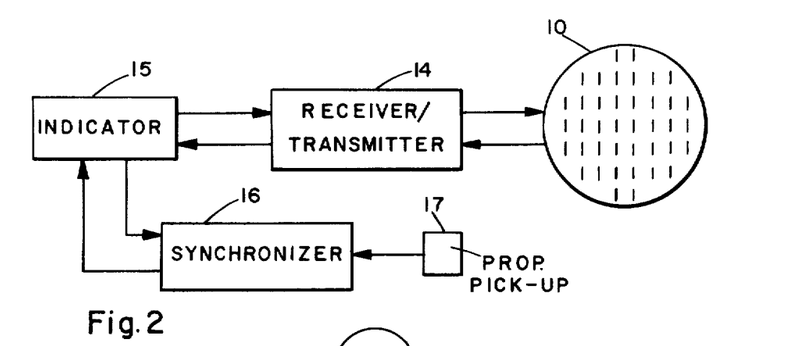
FIG. 2 is a block diagram illustrating how the disclosed invention is integrated into a pre-existing radar system.

An indicator unit 15 is connected by a cable to the transmitter/receiver unit 14. This is illustrated schematically in the block diagram of FIG. 2. Preferably, indicator 15 includes a T.V. screen which displays the information that the radar senses. All of the units 10, 14 and 15 are commercially available items. They are included, for example, within the RCA Primus-20 WXD Radar System. In addition, however, the disclosed synchronized radar system includes a synchronizer 16. It allows the radar pulses to be fired from behind the airplane's propeller. Without synchronizer 16, units 10 and 14 must be mounted out on the wing of the plane. This, of course, is undesirable for the reasons stated in the Background portion of the disclosure.

Figure 3:
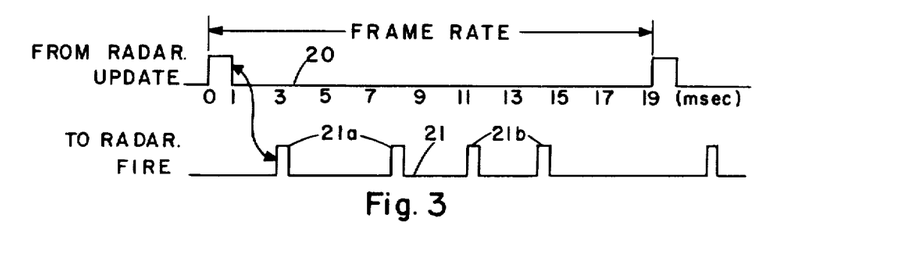
FIG. 3 is a timing diagram illustrating generally the operation of the disclosed invention.

The manner in which synchronizer 16 modifies the operation of the standard radar units 10, 14 and 15 is generally illustrated in the timing diagram of FIG. 3. There, a curve 20 represents a signal UPDATE that is generated within indicator 15 to define the frame rate of the T.V. screen. One typical frame rate is 53.5 Hz. In other words, one frame occurs approximately every 19 milliseconds.

During each frame, indicator 15 commands the transmitter/receiver unit 14 to "fire" a predetermined number of radar pulses and to monitor their return. These fire commands are indicated via curve 21. When the radar unit is mounted on the wing of the plane, the fire commands may be generated whenever the update signal is low. Thus, in all of the commercially available radar units, the fire signal is generated at fixed time instants during each frame.

In comparison, synchronizer 16 operates to synchronize the generation of the fire commands with the position of the airplane's propeller. This is done such that none of the radar pulses that are transmitted via antenna 10, and none of the corresponding returns, hit the propeller blades. At the same time, synchronizer 16 insures that the number of fire commands which are sent during each frame is equal to the above described predetermined number. For example, if two fire commands are required per frame, then synchronizer 16 might generate them at time instants 21a during one frame, and during time instants 21b during another frame.

Figure 4:
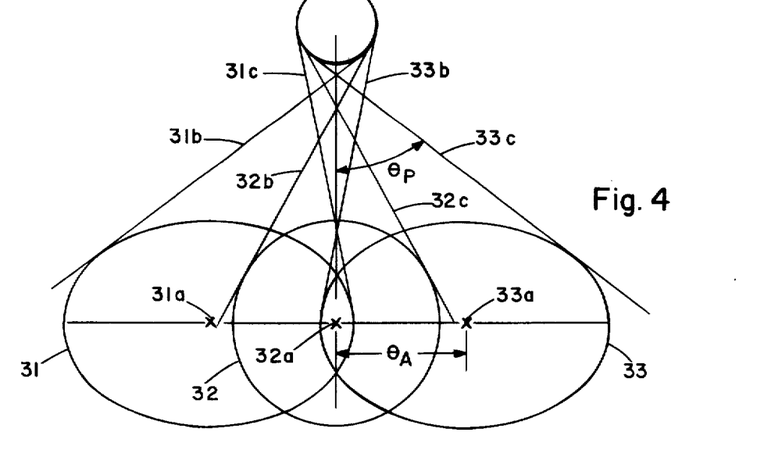
FIG. 4 is a set of curves illustrating the intersection of a radar beam with a propeller's plane of rotation.

The method by which synchronizer 16 decides when to send the fire commands will now be described in conjunction with the FIGS. 4, 5 and 6. Referring first to FIG. 4, there is illustrated a scaled computerized plot of the intersection between the radar beam from antenna 10 and the vertical plane in which propeller 12 rotates. In that figure, curve 31 indicates the intersection when the radar beam has an azimuth angle of minus 45°, curve 32 indicates the intersection when the radar has an azimuth angle of 0°, and curve 33 indicates the intersection when the radar beam has an azimuth angle plus 45°. Reference numerals 31a, 32a and 33a, respectively, indicate the center of these radar beams.

When the radar is to be fired at an angle of minus 45°, no fire commands are allowed between the time that the leading edge of the propeller reaches position 31b and the time that the trailing edge of the propeller reaches position 31c. Similarly, when the radar is to be fired at an angle of 0°, lines 32b and 32c respectively, define the leading edge propeller position and trailing edge propeller position between which fire commands cannot be sent. And when the radar is to be fired at an angle of plus 45°, lines 33b and 33c respectively, define the corresponding critical leading edge propeller position and trailing edge propeller position.

Figure 5:
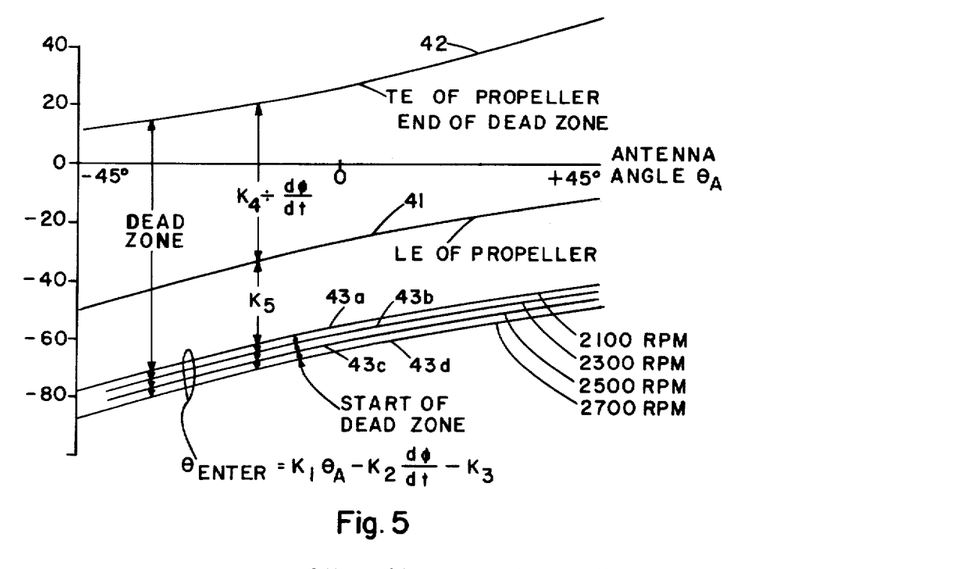
FIG. 5 is a set of curves illustrating the dead zone as a function of antenna angle.
Figure 6:
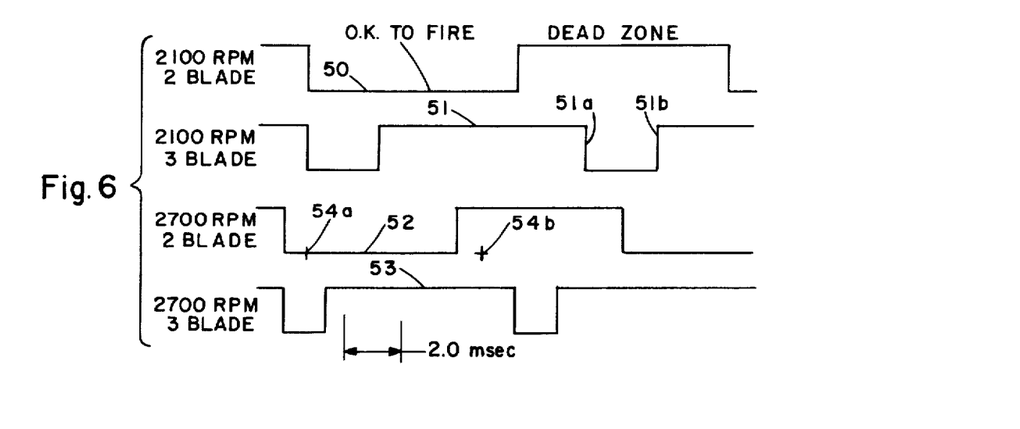
FIG. 6 is a set of curves illustrating the dead zone as a function of time.

A computerized plot of the above described leading edge and trailing edge propeller positions as a function of the antenna azimuth angle $\theta_A$ is given in FIG. 5. There, curve 41 gives the leading edge angle; while curve 42 gives the trailing edge angle. Curve 41 has a slight bend towards the horizontal axis. Thus, curve 41 lies within a straight line which interconnects its end points. And since the propeller angles that are given by the straight line are greater than the corresponding propeller angles given by curve 41, a straight line can be used as an approximation to curve 41.

Similarly, curve 42 also has a slight bend towards the horizontal axis. Thus, a straight line connecting the end points of curve 42 can also be used as an approximation to that curve. That is, the propeller angles given by such a straight line approximation will be greater than or equal to the corresponding angles given by curve 42.

The dead zone within which synchronizer 16 must inhibit all fire commands includes the area between curves 41 and 42. In addition, however, it includes an area prior to curve 41. This latter area is needed in order to insure a sufficient amount of time for the return of any radar pulses that are fired prior to the propellers leading edge reaching the angle defined by curve 41. A time interval of approximately 2.4 milliseconds is sufficient to allow returns from 200 nautical miles. This 2.4 milliseconds when converted to propeller angle is dependent upon the speed of the propeller. Thus, in FIG. 5, a family of curves 43a through 43d indicate the start of the dead zone as a function of the propeller speed. These curves may also be approximated by a straight line. Thus, curves 43a and 43d are of the form $K_1\theta_A$ minus $K_2 (d\phi/dt) - K_3$ where $K_1$, $K_2$, and $K_3$ are constants.

Analysis of FIG. 5 curves shows that the dead zone consists of a fixed angular increment in combination with a variable angular increment. The former is given by the angle between the straight line approximations of curves 41 and 42; and the latter is given by the angle between curve 41 and curves 43a–43d. Alternatively, the dead zone may be defined as a fixed time interval in combination with a variable time interval. The fixed time interval equals the time it takes the propeller to travel between the angles defined by curves 43a and 43d and curve 41; whereas the variable time interval is the time that it takes the propeller to travel between the angles defined by curves 41 and 42. Thus, the dead zone in terms of time is of the form $K_4 \div (d\phi/dt) + K_5$ where $K_4$ and $K_5$ and constants.

All of the above described constants $K_1$ through $K_4$ depend upon the geometries involved. In particular, they depend upon the diameter of the radar beam, the width of the propeller, the distance from the center of the propeller to the center of the radar beam when it is at an azimuth angle of 0°, and the distance of the pivot point of the radar to the rotational plane of the propeller. In one embodiment actually constructed and tested, the radar beam diameter was ten inches, the propeller width was four inches, the distance between the propeller axis of rotation and the center of the radar beam was sixteen inches, and the distance of the pivot point of the radar to the rotational plane of the propeller was six inches. Under these conditions, the constants $K_1$ through $K_4$ respectively equaled 0.411, 0.0143, 46° and 9.176.

Using the above constants, the computer plot illustrating how the dead zone varies with time was made. This is indicated in FIG. 6. There, curves 50 and 51 respectively, illustrate the dead zone for a two blade propeller, and for a three blade propeller, rotating at 2100 RPM. A high level on either of these curves indicates when the dead zone exists. Similarly, curves 52 and 53 respectively, indicate the dead zone for a two blade propeller, and a three blade propeller, rotating at 2700 RPM.

The rising edges of curves 50–53 correlate with the previously described curves 43a–43d of FIG. 5; and the falling edges correlate to the previously described curve 42. That is, a rising edge, such as 51b, indicates when a propeller blade has reached the angle of rotation beyond which it will intersect the radar return signal of a newly fired radar pulse. Similarly, a falling edge such as edge 51a indicates that the propeller blade has reached an angle where it is just exiting its intersection with the radar beam.

Accordingly, it is the function of the synchronizer to generate the fire commands only when the dead zone signals are low. At the same time, it is the function of the synchronizer to generate the correct number of fire commands during each of the frames of the indicator as was previously described in conjunction with FIG. 3. There, each frame lasted approximately 19 milliseconds and two fire commands were required by the indicator unit during each frame.

It should also be emphasized that the beginning and end of each frame occurs asynchronously with the dead zone signals. That is, the dead zone signals are generated as a function of the radar's azimuth angle and the propeller's speed and position. In comparison, the frame rate signals are generated by a free running oscillator within the indicator unit. Thus, one frame might start at the point indicated by a reference numeral 54a; while another frame might start at the point indicated via reference numeral 54b. In summary, then it is the function of the synchronizer to generate a predetermined number of fire commands to indicator 15 during each frame while at the same time ensuring that no fire commands are sent in a dead zone.

Figure 7:
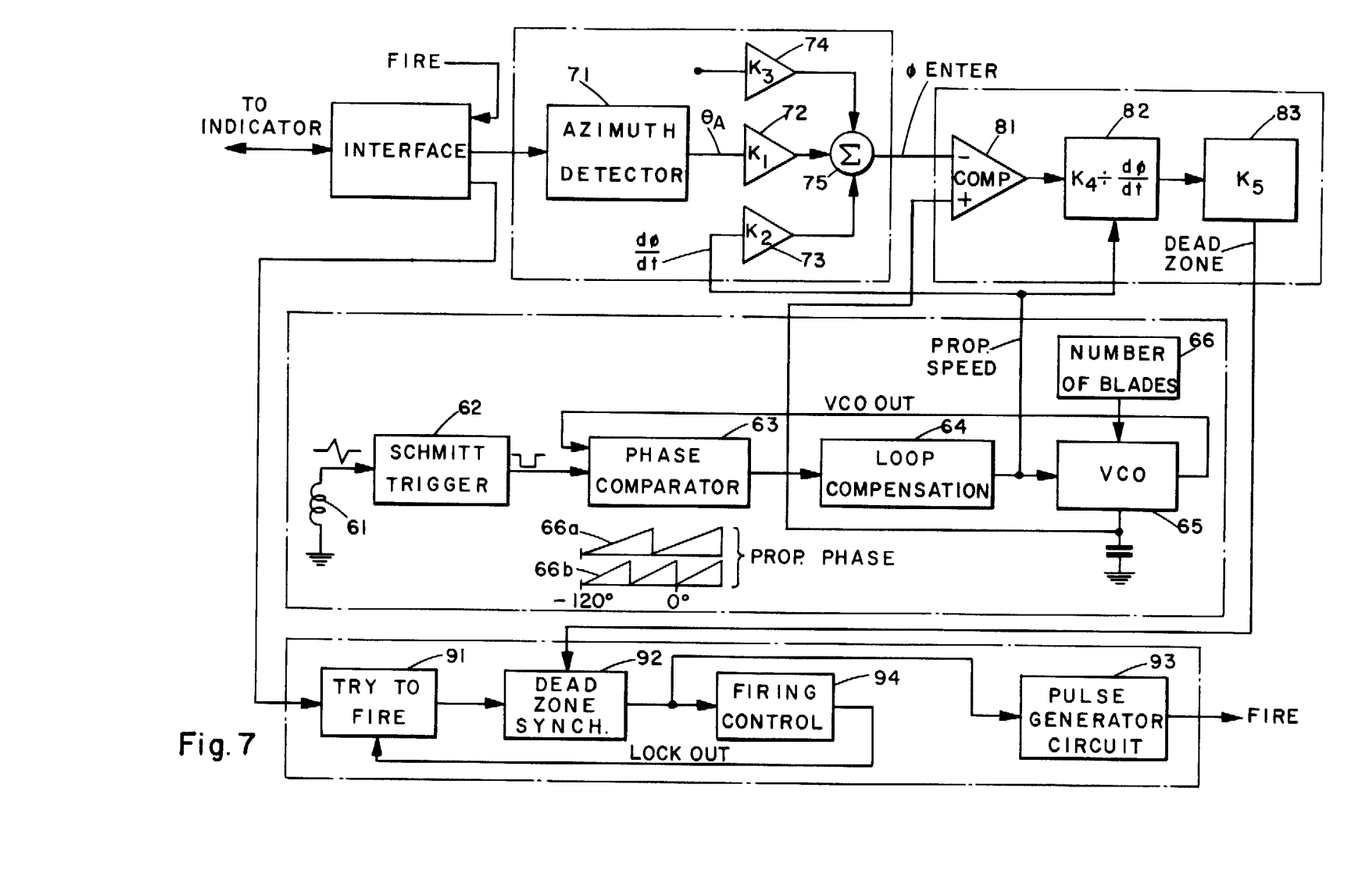
FIG. 7 is a block diagram of the synchronizer in FIG. 2.

A block diagram of a synchronizer that performs the above defined function is illustrated in FIG. 7. It includes a phase locked loop which is indicated by reference numerals 61 through 66. Component 61 is a coil that is mounted alongside of the propeller. Signals are induced therein by magnets which are rigidly fastened onto the propeller blades. Thus, the induction of a voltage into coil 61 is an indication of the propeller's instantaneous position. In one embodiment, coil 61 is mounted to indicate when the propeller's angle $\phi$ p is at minus 120°.

The signal from coil 61 is sent to a Schmitt trigger 62. It operates to square up the edges of the signal from coil 61. This makes the signal more suitable for use by the following phase comparator 63. Comparator 63 operates to produce output signal that is representative of the phase difference between its two input signals. This signal is sent through a loop compensation network 64 which integrates and smooths out the signal from the comparator. The output of loop compensator 64 is a signal entitled "Prop Speed". It has a magnitude that indicates the speed of the propeller.

Signal PROPSPEED drives a voltage controlled oscillator 65. The oscillator in turn produces a pair of output signals entitled VCO OUT and PROP PHASE. Signal VCO OUT consists of a series of spaced pulses that are in the phase with the pulses received from trigger 62. In comparison, signal PROP PHASE is a ramp-shaped waveform as indicated via curves 66a and 66b. These curves, respectively, correspond to the waveforms that are generated for a two blade propeller and for a three blade propeller. A voltage level of zero volts indicates when one of the propeller blades is at minus 120°; whereas a voltage level of four volts indicates when that same blade is at an angle of 0°.

Signals PROP SPEED and PROP PHASE are utilized to determine when one of the propeller blades is within the previously defined dead zone. To that end, the FIG. 7 circuit includes a circuit for computing the angle $\theta$ enter at which the dead zone starts. That circuit includes components 71 through 75. Components 71 and 72 receive digital signals from which the azimuth angle of the radar can be determined. These are then converted to an analog voltage whose magnitude is representative of that angle. Thus, the output of component 72 is the previously defined term $K_1\theta_A$.

Similarly, components 73 and 74 operate to respectively generate the previously defined terms $K_2$, $d\phi/dt$ and $K_3$. All of these terms are added by component 75 which is a summer. Thus, the output of summer 75 is a voltage whose magnitude is representative of the entering angle of the dead zone.

To actually generate the dead zone signal, the FIG. 7 circuit includes components 81 through 83. Component 81 is a comparator which operates to compare signals $\phi$ enter and PROP PHASE. Thus, a low to high transition at the output of comparator 81 indicates that the propeller has just entered the dead zone. This signal is then fed through components 82 and 83 which measure the width of the dead zone. As previously described, this width consists of one fixed time interval, and one variable time interval. Component 82 generates a signal having a pulse width equal to the length of the variable time interval. That is, it generates an output signal whose pulse width equals $K_4$ divided by $d\phi/dt$. This output signal is then passed through component 83 which stretches the pulse width by a fixed amount $K_5$. In summary then, the dead zone signal at the output of the component 83 is of the form $K_4 \div (d\phi/dt) + K_5$.

What remains to be done then is to utilize this dead zone signal in conjunction with the update signal (which defines the frame spacing) to generate the fire commands. This is performed by components 91 through 94. Basically, component 91 operates to receive the update signal, and in response thereto, to try to generate a fire command. An attempt to generate this fire command is inhibited by component 92 when a dead zone exists. The output of component 92 couples to component 93 which generates the fire command; and in addition, it couples to component 94 which keeps track of the number of fire commands that have been generated in each frame. After the predetermined number of fire commands have been generated, component 94 produces a lockout signal. This signal is fed back to component 91 which inhibits further fire commands until the beginning of the next frame.

Figure 8:
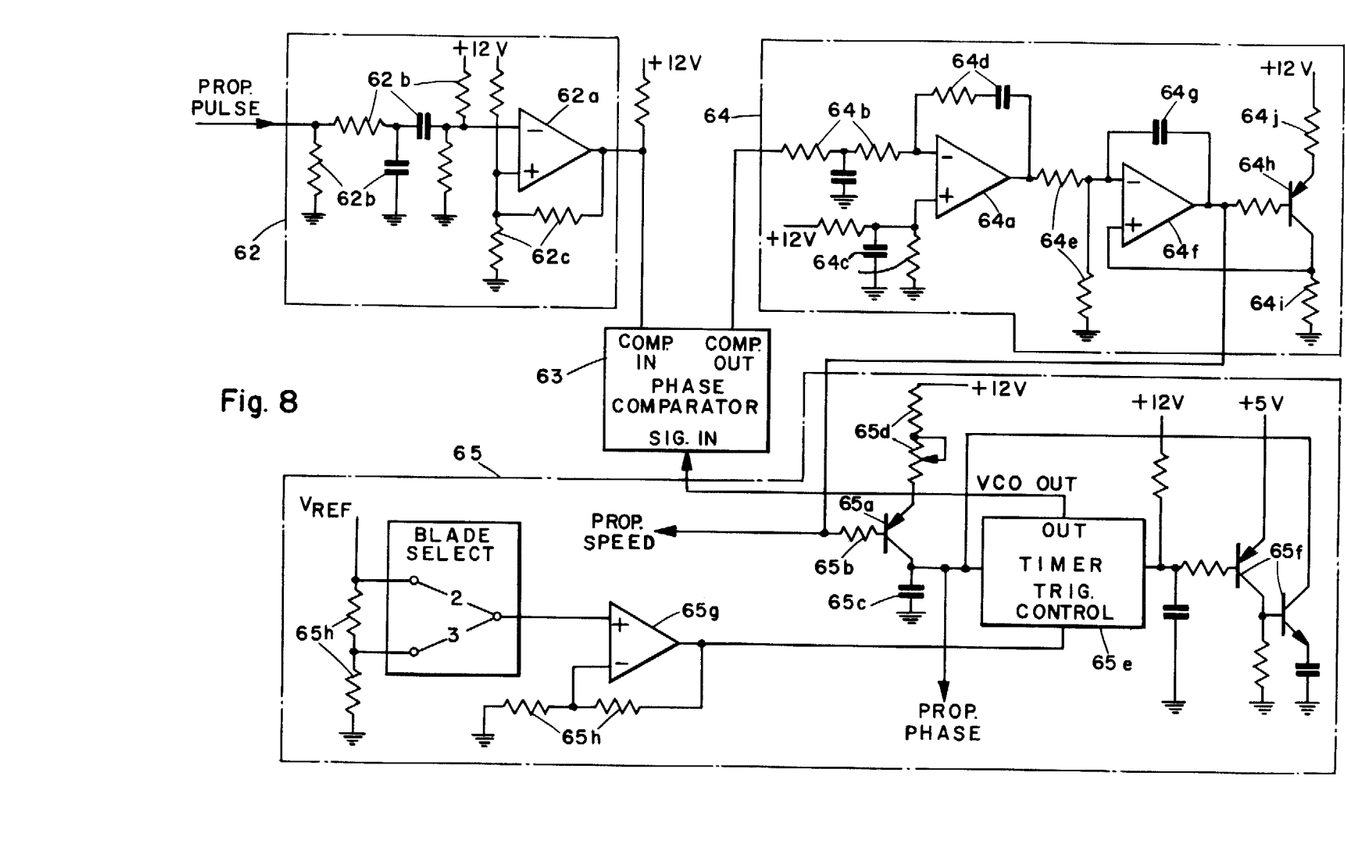
FIG. 8 is a detailed circuit diagram of a phase locked loop within FIG. 7.

FIGS. 8 through 11 are detailed circuit diagrams of each of the above described modules. Referring first to FIG. 8, the phase locked loop module will be described. As therein illustrated, trigger circuit 62 includes a differential amplifier 62a to which is connected a resistor-capacitor input network 62b, and a resistor feedback network 62c. Amplifier 62a connects to one of the inputs of phase comparator 63. Suitably, comparator 63 consists of an integrated circuit chip CD4046. The comparator in turn connects to a differential amplifier 64a through a resistive input 64b. Amplifier 64a also has a reference voltage input network 64c, and a resistor-capacitor feedback network 64d.

Basically, components 64a-64d operate to integrate the signals from the phase comparator and thus produce a signal at the output of amplifier 64a having a magnitude proportional to the propeller's speed. This voltage is then shifted in level by component 64e through 64j. Specifically, amplifier 64f produces a voltage at its output which causes current to flow through transistor 64h. This current then produces a voltage across resistor 64i which is equal to the voltage that is applied to the negative input of amplifier 64f by amplifier 64a.

A voltage controlled current source that is similar to components 64h and 64j is formed by components 65a through 65d. That is, the current through transistor 65d is proportional to the magnitude of signal PROP SPEED. This current is then integrated by capacitor 65c to form signal PROP PHASE; that signal is a saw tooth shaped waveform having a magnitude proportional to the propeller's phase as illustrated in FIG. 7.

Signal PROP PHASE feeds to a timer 65e. Suitably, timer 65e is a NE 555 timer chip. In operation, the timer produces an output signal whenever the voltage on its trigger input is greater than the voltage on its control unit. One output of the timer feeds back through a switching circuit 65f to capacitor 65c. It enables the capacitor to be quickly discharged. Another output of timer 65i e feeds back to phase comparator circuit 63. It enables the oscillator to be locked in phase with the propeller.

The remaining portion of the FIG. 8 circuit generages a reference voltage for the control input of timer 65e. This reference voltage is produced by a differential amplifier 65g in combination with a resistor network 65h. The reference voltage equals 4 volts for a three bladed propeller, and equals 6 volts for a two bladed propeller.

Figure 9:
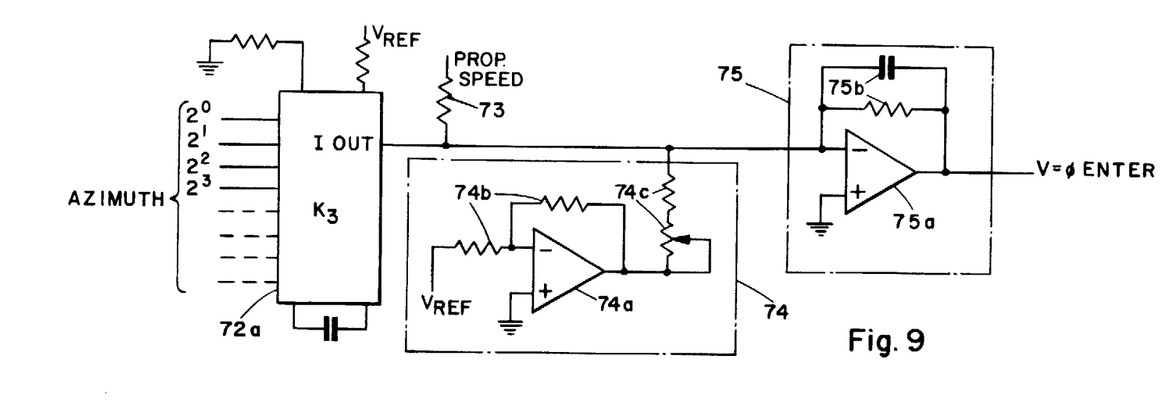
FIG. 9 is a detailed circuit diagram of the components which compute $\phi$ enter within FIG. 7.

Next, the detailed circuits which form signal $\phi$ enter will be described in conjunction with the FIG. 9. As therein illustrated, summer 75 includes a differential amplifier 75a having a feedback network 75b. Signal PROP SPEED is coupled to this amplifier through a resistor 73. This forms the term $K_2 \times (d\phi/dt)$. In comparison, the term K3 is formed by a differential amplifier 74a having feedback and input resistors 74b. This term is coupled to the summer through a resistor 74c. Finally, the term $K_1 \theta_A$ is provided by a digital to analog converter chip 72a. The digital input signals to this chip represent the azimuth angle of the antenna. They are readily derived from signals within indicator 15.

Figure 10:
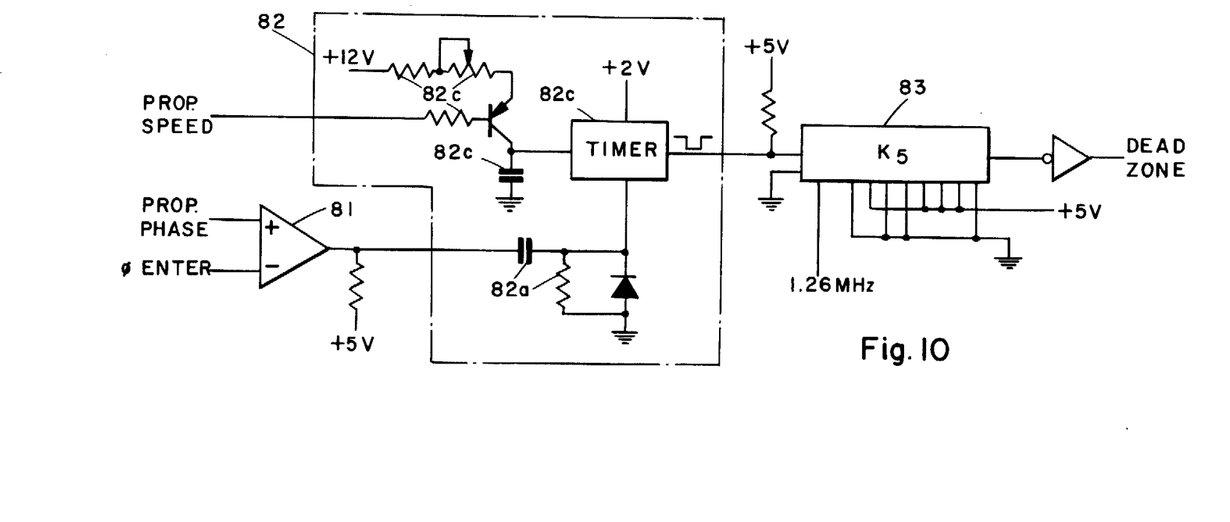
FIG. 10 is a detailed circuit diagram of the components which compute the dead zone within FIG. 7.

FIG. 10 is a detailed circuit of components 81 through 83. Component 81 consists of a comparator chip such as an LM311. It has an inverting input connected to receive signal $\phi$ enter, and has a non-inverting input connected to receive signal PROP PHASE. Thus, the output of comparator 81 makes a low to high transition at the instant that the propeller blade enters the dead zone.

This output signal is differentiated by a resistor capacitor network 82a, and the pulse which results is sent to the trigger input of a timer 82b. Suitably, this timer consists of an LM322 timer chip. The other input of timer 82b connects to the voltage controlled current source 82c. In operation, the voltage across the capacitor of current source 82c is forced to zero by a timer circuit 82b until it receives a trigger pulse. Then, the capacitor is allowed to charge at a rate which is determined by signal PROP SPEED. Thus, a sawtooth waveform is generated across the capacitor. When the magnitude of this sawtooth exceeds a value which is determined by the V-adjust input on timer 82b, the timer discharges the capacitor. And the capacitor stays discharged until the timer receives another trigger pulse.

During the time that the capacitor is charging, timer 82b generates an output pulse. Thus, the pulse has a width which is proportional to $K_4$ divided by $d\phi/dt$. The output of timer 82b connects to a counter chip 83, which suitably is a CD4059. That chip's external inputs are connected such that in operation, the chip produces an output signal having a pulse width equal to the width of the signal from timer 82b plus a constant. Thus, the signal from chip 83 is of the form $K_4 \div d\phi/dt + K_5$. And as was previously described, this is the form of the length of the dead zone.

Figure 11:
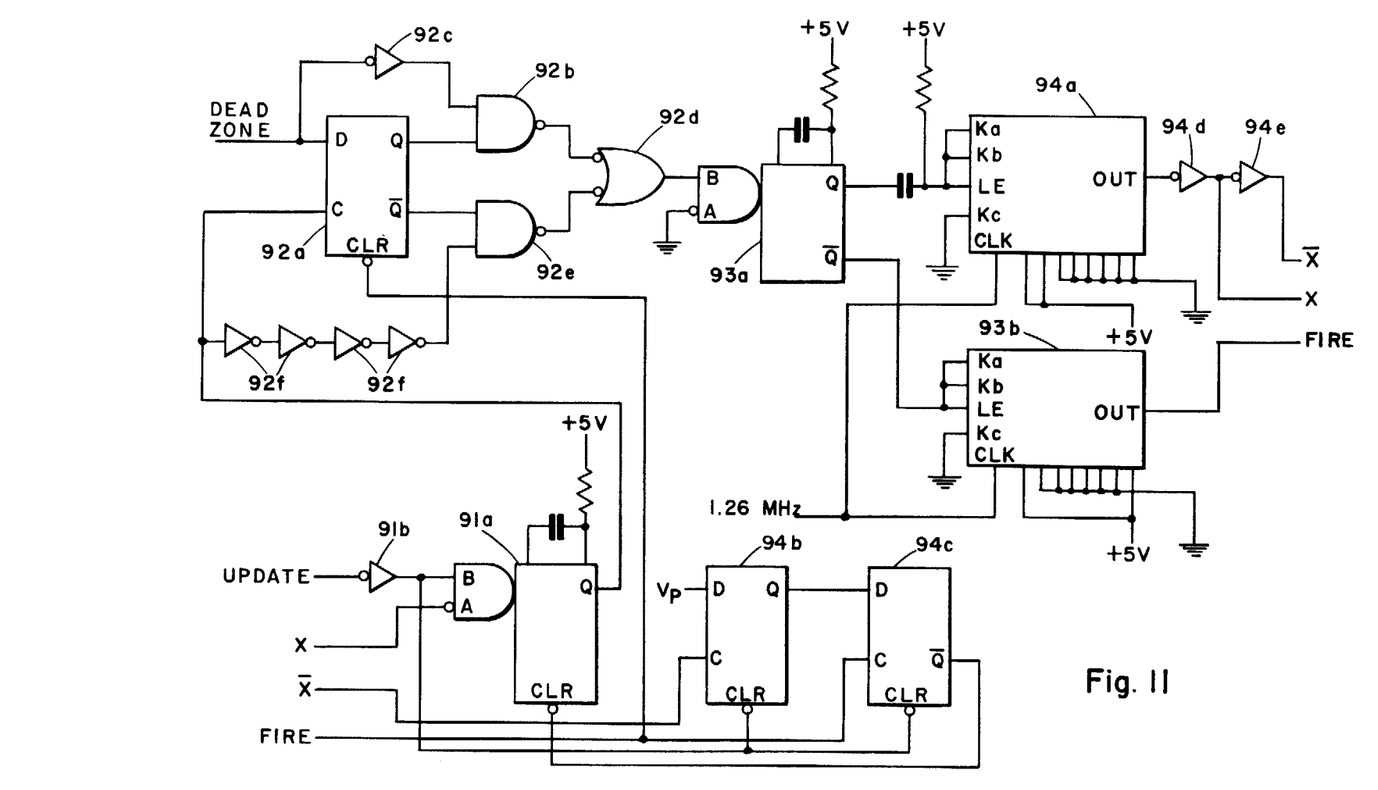
FIG. 11 is a detailed logic diagram of the components which generate the fire commands within FIG. 7.

Referring now to FIG. 11, the detailed circuitry of synchronizing modules 91 through 94 will be described. Module 91 includes a one-shot 91a which is triggered when either its A input goes low or its B input goes high. Suitably, one shot 91a consists of a 74LS221 chip. The B input is connected to the update signal through an inverter 91b. As a result, the one shot 91a generates an output pulse whenever the update signal indicates that a new frame is started. This pulse is sent to the clock input of a D flip-flop 92a. Also the D input of this flip-flop receives the dead zone signal. Thus, if at the start of a new frame, the propeller is in a dead zone, flip-flop 92a sets. In that case, the Q output of the flip-flop enables a NAND gate 92d. The other input to gate 92b is coupled through an inverter 92c to the dead zone signal. Thus, gate 92b produces a low output only after the termination of the dead zone. This low output is "or" ed by a gate 92d which in turn drives the logic which produces the FIRE command.

Alternatively, the dead zone signal may be low when one shot 91a is triggered by the update signal. In that case, flip-flop 92 resets, and thus enables another NAND gate 92e. Gate 92e has a second input which is connected through a series of gates 92f which acts as a delay to one shot 91a. As a result, gate 92c produces a low putout which is "or" ed by gate 92d, which in turn produces the FIRE command.

A one shot 93a and a counter 93b serially connect to the output of gate 92d to generate a suitable pulse width for the FIRE command. One shot 93a produces a relatively short pulse, such as 18 microseconds; whereas counter 93b extends the width of this pulse to the desired length. Suitably, counter 93b produces an output pulse of approximately 2.3 milliseconds.

A pulse of slightly longer duration is generated by another counter 94a. This counter is utilized in conjunction with a pair of flip-flops 94b and 94c to insure that no more than the predetermined number of FIRE commands are generated during each frame. At the start of a frame, the update signal clears flip-flops 94b and 94c. Subsequently, after the first FIRE command has been generated, the output of counter 94a generates a signal which passes through a pair of inverters 94d and 94e to clock flip-flop 94b. As a result, the Q output of flip-flop 94b goes high.

At the same time, the output of inverter 94d is fed back to the A input of one shot 91a. As a result, the one shot fires and clocks flip-flop 92a as was described above. Eventually, therefore, another FIRE command will be generated. This FIRE command is fed to the clock input of flip-flop 94c which sets the Q output of flip-flop 94b then feeds back to the B input of one shot 91a and inhibits its further operation. Therefore, the second FIRE command will be the last command sent, until another update signal is received which re-initializes flip-flops 94b and 94c.

A preferred embodiment of the invention has now been described in detail. In addition, many changes and modifications can be made to these details without departing from the nature and spirit of the invention. Therefore, it is to be understood that the invention is not limited to said details but is defined by the appended claims.

I claim:

1. A method of synchronizing the firing of radar pulses from behind the propeller of an airplane, said method including the steps of:
   determining a dead zone comprising an angular increment of blade position within which if the radar is fired a blade of said propeller will intersect the path of said radar pulse or its return and outside of which no blade of said propeller will intersect the path of said pulse or its return;
   detecting when any blade of said propeller is within said dead zone; and
   firing said radar only when no blade of said propeller is within said dead zone.

2. A method according to claim 1 and further including the steps of:
   sensing the instantaneous azimuth angle $\theta_A$ at which said radar is to be fired;
   sensing the instantaneous rotational speed $d\phi/dt$ of said propeller;
   said step of determining a dead zone is further characterized by determining a dead zone within which a blade of said propeller rotating at said speed $d\phi/dt$ will intersect the path of said radar pulse or its return at said angle $\theta_A$.

3. A method according to claim 2 wherein said dead zone is determined by the steps of:
   generating a first signal representative of the angle of said propeller at which said dead zone starts; and
   generating a second signal representative of the time duration of said dead zone.

4. A method according to claim 3 wherein said step of generating a first signal comprises the step of generating an analog signal of the form $K_1\theta_A - K_2(d\phi/dt) - K_3$ where $K_1$, $K_2$ and $K_3$ are constants.

5. A method according to claim 3 wherein said step of generating a second signal comprises the step of generating an analog signal of the form $K_4 \div (d\phi/dt) + K_5$ where $K_4$ and $K_5$ are constants.

6. A method according to claim 1 and further including the steps of:
   receiving an externally generated timing signal defining a plurality of consecutive fixed length time intervals, and
   performing said firing step a predetermined number of times during each of said time intervals.

7. Apparatus for synchronizing the firing of radar pulses from behind the propeller of an airplane, said apparatus being comprised of:
   means for determining a dead zone comprising an angular increment of blade position within which if the radar is fired a blade of said propeller will intersect the path of said radar pulse or its return and outside of which no blade of propeller will intersect the path of said pulse or its return;
   means for detecting when any blade of said propeller is within said dead zone; and
   means for generating commands to fire said radar only when no blade of said propeller is within said dead zone.

8. Apparatus according to claim 7 further including:
   means for sensing the instantaneous azimuth angle $\theta_A$ at which said radar is to be fired;
   means for sensing the instantaneous rotational speed $d\phi/dt$ of said propeller;
   said means for determining a dead zone is further characterized by determining a dead zone within which a blade of said propeller rotating at said speed $d\phi/dt$ will intersect the path of said radar pulse or its return at said angle $\theta_A$.

9. Apparatus according to claim 7 wherein said means for generating includes means for receiving an externally generated timing signal defining a plurality of consecutive fixed length time intervals, and also includes means for generating said commands a predetermined number of times during each of said time intervals.

10. Apparatus according to claim 7 wherein said means for determining includes means for generating a first signal representative of the angle of said propeller at which said dead zone starts; and further includes means for generating a second signal representative of the time duration of said dead zone.

11. Apparatus according to claim 10 wherein said means for generating a first signal comprises means for generating an analog signal of the form $K_1\theta_A - K_2(d\phi/dt) - K_3$ where $K_1$, $K_2$ and $K_3$ are constants.

12. Apparatus according to claim 10 wherein said means for generating a second signal comprises means for generating an analog signal of the form $K_4 \div (d\phi/dt) + K_5$ where $K_4$ and $K_5$ are constants.

* * * * *